(12) United States Patent
Martinek et al.

(10) Patent No.: US 7,931,538 B2
(45) Date of Patent: Apr. 26, 2011

(54) TORQUE DAMPENING COMPENSATOR FOR A VEHICLE

(75) Inventors: Christopher Martinek, Cedarburg, WI (US); Joel Kopp, Milwaukee, WI (US); William Boppre, West Bend, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 427 days.

(21) Appl. No.: 12/171,746

(22) Filed: Jul. 11, 2008

(65) Prior Publication Data

US 2010/0009763 A1    Jan. 14, 2010

(51) Int. Cl.
F16D 3/70    (2006.01)
(52) U.S. Cl. ............................. 464/73; 464/85
(58) Field of Classification Search .................... 464/73, 464/75, 76, 85
See application file for complete search history.

(56) References Cited

U.S. PATENT DOCUMENTS

| | | | |
|---|---|---|---|
| 1,790,614 A | | 1/1931 | Leipert |
| 2,025,825 A | * | 12/1935 | Ricefield .................. 464/73 |
| 2,764,003 A | | 9/1956 | Croset |
| 2,873,590 A | | 2/1959 | Croset |
| 3,257,860 A | | 6/1966 | Runde et al. |
| 3,345,831 A | * | 10/1967 | Boole |
| 3,747,720 A | | 7/1973 | Jensen |
| 4,037,431 A | | 7/1977 | Sugimoto |
| 4,328,879 A | | 5/1982 | Tone |
| 4,486,183 A | | 12/1984 | Posiviata et al. |
| 4,585,431 A | | 4/1986 | Umeda et al. |
| 4,794,998 A | | 1/1989 | Iwai et al. |
| 5,240,087 A | | 8/1993 | Parker |
| 5,452,622 A | | 9/1995 | Fenelon |
| 5,564,981 A | | 10/1996 | Iwabuchi et al. |
| 5,720,638 A | | 2/1998 | Hale |
| 5,956,998 A | | 9/1999 | Fenelon |
| 5,957,740 A | | 9/1999 | Matsuda et al. |
| 6,045,448 A | | 4/2000 | Kern et al. |
| 6,371,461 B1 | | 4/2002 | Stahl |

(Continued)

FOREIGN PATENT DOCUMENTS

CH    584611    2/1977

(Continued)

OTHER PUBLICATIONS

Appendix A—Prior Art Rear Wheel Compensator 1 (with statement of relevance), 3 pages.

(Continued)

*Primary Examiner* — Greg Binda
(74) *Attorney, Agent, or Firm* — Michael Best & Friedrich LLP

(57) ABSTRACT

A torque dampening compensator for a vehicle including an isolator member disposed between an input member and an output member. The isolator member includes isolator elements disposed between corresponding lugs of the respective input and output members. The lugs of the output member have a draft angle, and the isolator elements have contact faces corresponding to the respective lugs with unequal axial depths to induce a moment on each isolator element that counteracts a thrust load between the input and output members initiated by the draft angle. One isolator element of the isolator member is formed to have a size corresponding to the space provided between adjacent lugs of the input and output members and a shape that is dissimilar from the space. The one isolator element is resiliently deformable into the space.

16 Claims, 14 Drawing Sheets

U.S. PATENT DOCUMENTS

| | | |
|---|---|---|
| 6,516,912 B2 | 2/2003 | Iwai et al. |
| 6,659,819 B2 | 12/2003 | Fuse |
| 7,083,022 B2 | 8/2006 | McWhorter et al. |
| 2003/0220146 A1 | 11/2003 | Bonninger et al. |
| 2006/0205293 A1 | 9/2006 | Fuse |
| 2007/0021249 A1 | 1/2007 | Shao et al. |

FOREIGN PATENT DOCUMENTS

| | | |
|---|---|---|
| JP | 11059109 | 3/1999 |
| JP | 2001130212 | 5/2001 |
| JP | 2003056644 | 2/2003 |
| JP | 2003154804 | 5/2003 |
| WO | 03101816 A1 | 12/2003 |

OTHER PUBLICATIONS

Appendix B—Prior Art Rear Wheel Compensator 2 (with statement of relevance), 3 pages.

* cited by examiner

TORQUE DAMPENING COMPENSATOR FOR A VEHICLE

BACKGROUND

The present invention relates to torque dampening compensators for vehicles. Existing compensators suffer from several common drawbacks. First, compensators generally rely on the compression of elastic material enclosed between input and output members to dampen torque pulsations, resulting in thrust loading of the compensator when the elastic material expands parallel to the axis of rotation, perpendicular to the direction of compression. Expensive thrust bearings have commonly been employed to handle the thrust load. Additionally, the elastic material provided in existing compensators provides a relatively fixed damping rate. Such compensators must sacrifice performance in either low-torque/vibration compensation or high-torque compensation capacity in favor of the other. If a balance is desired between low-torque performance and high-torque capacity, the compensator can achieve only mediocre performance in both areas. Furthermore, compression set introduces driveline lash after repeated use. Existing compensators have addressed compression set by oversizing and preloading the elastic material, complicating assembly.

SUMMARY

In one embodiment, the present invention provides a torque dampening compensator for a vehicle. The compensator includes an input member operable to receive an input torque. The input member includes a first lug portion operable to transmit the input torque. An output member is operable to transmit an output torque that is less than or equal to the input torque. The output member includes a second lug portion operable to receive the output torque. An isolator member is disposed between the input member and the output member. The isolator member is operable to receive the input torque from the input member, to selectively absorb a portion of the input torque, and to transmit the output torque to the output member. The isolator member includes a first portion positioned in a space between the first lug portion and the second lug portion. The first portion of the isolator member has a size corresponding to the space and a shape that is dissimilar to the space. The first portion of the isolator member is resiliently deformable into the space.

In another embodiment, the invention provides a torque dampening compensator for a vehicle. An input member is rotatable about an axis and operable to receive an input torque. The input member includes a first radially-extending lug operable to transmit the input torque. The first radially-extending lug has a first radially-extending contact face. An output member is rotatable about the axis and operable to transmit an output torque that is less than or equal to the input torque. The output member includes a second radially-extending lug operable to receive the output torque. The second radially-extending lug has a second radially-extending contact face. An isolator member is disposed between the input member and the output member. The isolator member is operable to receive the input torque from the input member, to selectively absorb a portion of the input torque, and to transmit the output torque to the output member. The isolator member includes a first portion having a first surface in contact with the first contact face and a second surface in contact with the second contact face. At least one of the first and second contact faces being non-parallel with the axis and having a draft angle promoting a thrust load between the input member and the output member when the isolator member is compressed between the first and second lugs. The first and second surfaces of the isolator member are asymmetrical, counteracting the thrust load.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
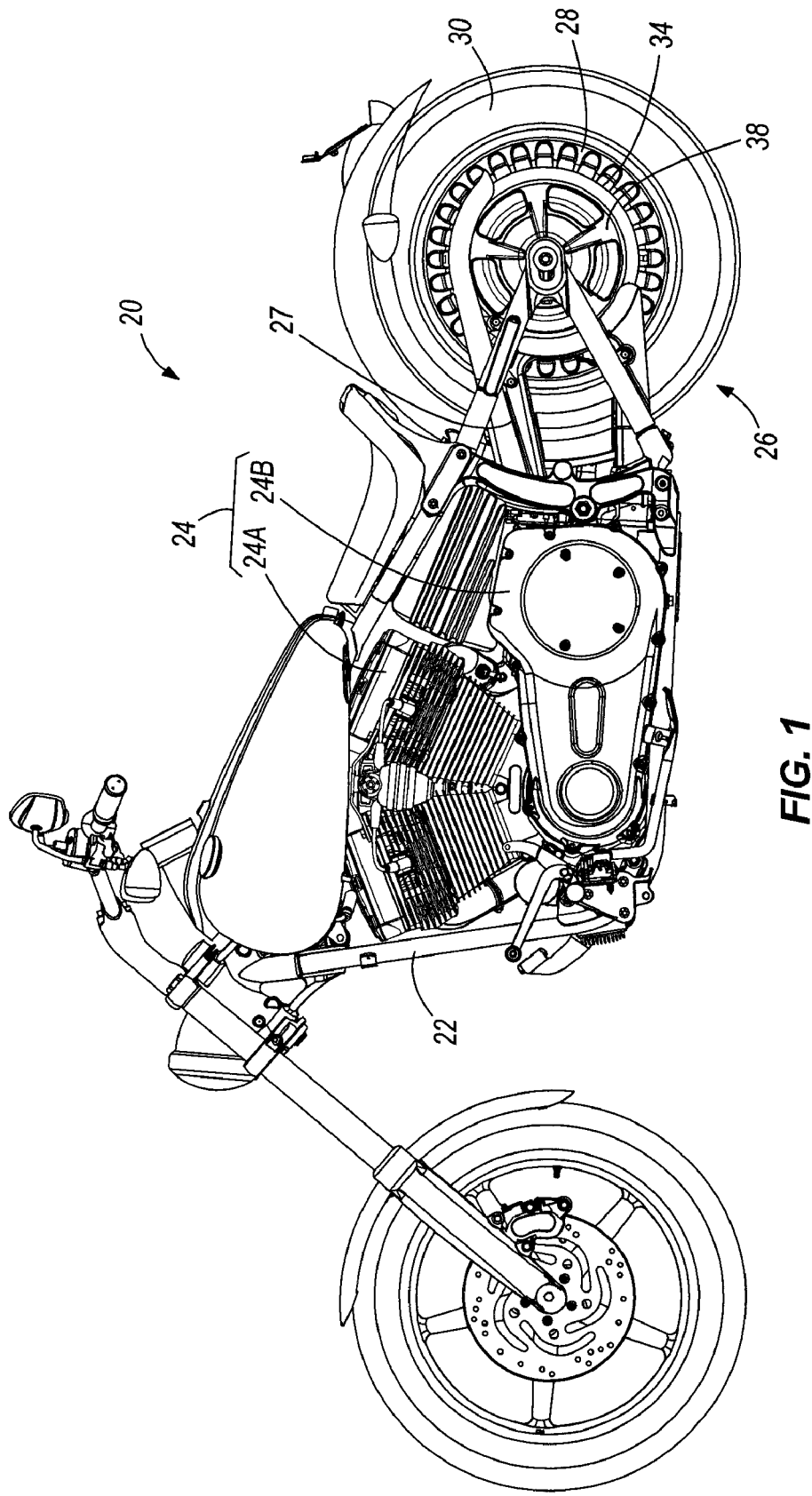
FIG. 1 is a side view of a motorcycle including a rear wheel compensator.

FIG. 1 illustrates a motorcycle 20 including a frame 22, an engine/transmission assembly 24 (including an engine 24A and a transmission 24B), and a rear wheel assembly 26 that is coupled to the engine/transmission assembly 24 to propel the motorcycle 20. The rear wheel assembly 26 receives rotational driving force from the engine/transmission assembly 24 through a drive member 27. The drive member 27 is driven by a sprocket or output gear of the engine/transmission assembly 24 and may take the form of an endless member such as a belt or chain, or alternately a drive shaft. The rear wheel assembly 26 includes, among other things, a wheel 28 and a tire 30 coupled to a rim 28A (FIG. 2) of the wheel 28 to rotate with the wheel 28. The tire 30 contacts a road surface to propel the motorcycle 20.

During operation of the motorcycle 20 and transmission of power and torque from the engine/transmission assembly 24 to the rear wheel assembly 26, torque spikes may occur (e.g., due to road conditions and/or abrupt throttle, clutch, or gear shift input from the rider, etc.). Such torque spikes occur in both the power-transmission direction ("positive") and the anti-power-transmission ("negative") direction. For example, a torque spike may occur in the positive direction when the engine 24A is running and the clutch is abruptly engaged with the transmission 24B in gear, and a torque spike may occur in the negative direction when the motorcycle 20 is traveling and the throttle position is abruptly reduced.

Figure 2:
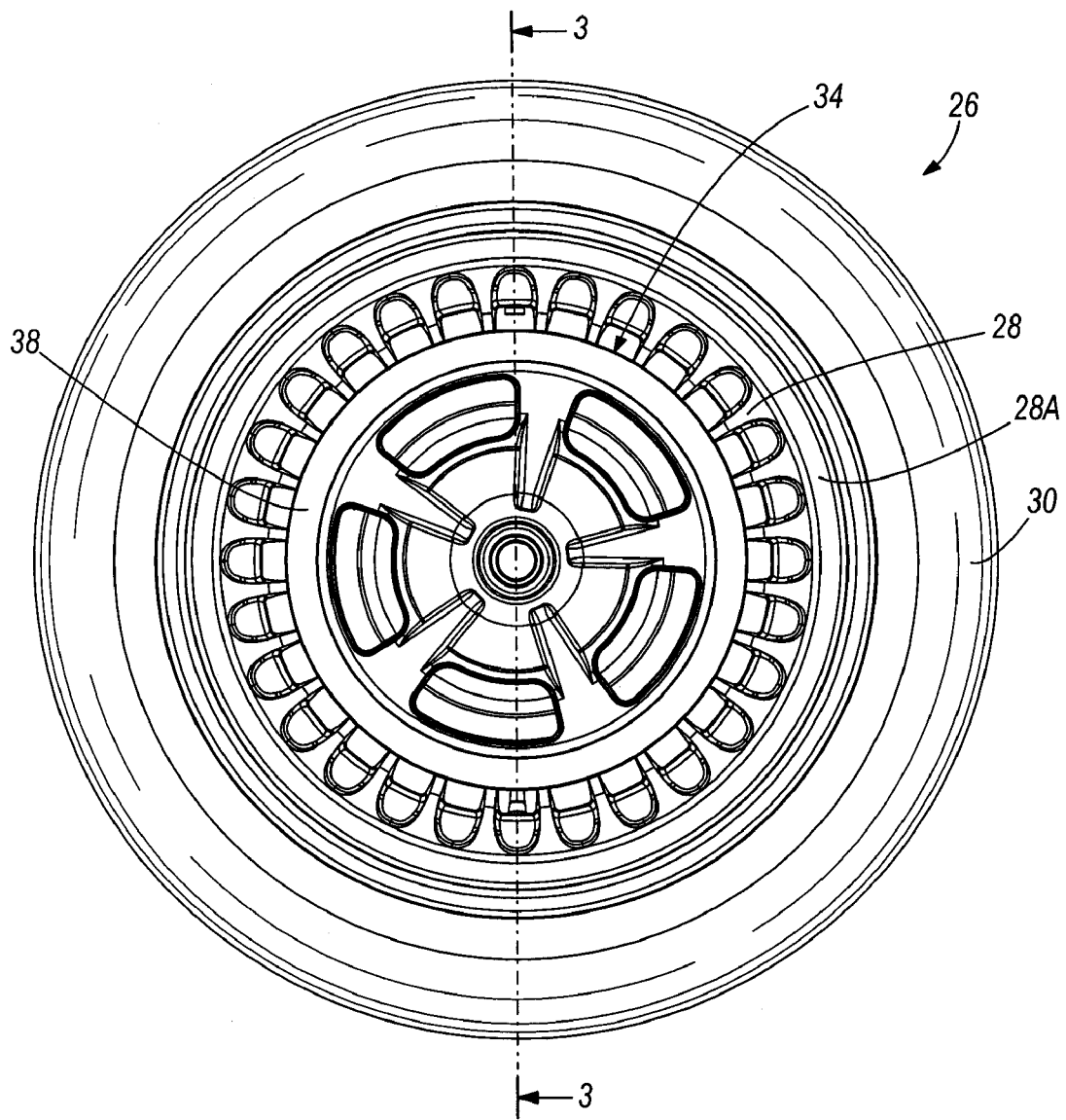
FIG. 2 is a side view of a rear wheel assembly of the motorcycle of FIG. 1.
Figure 3:
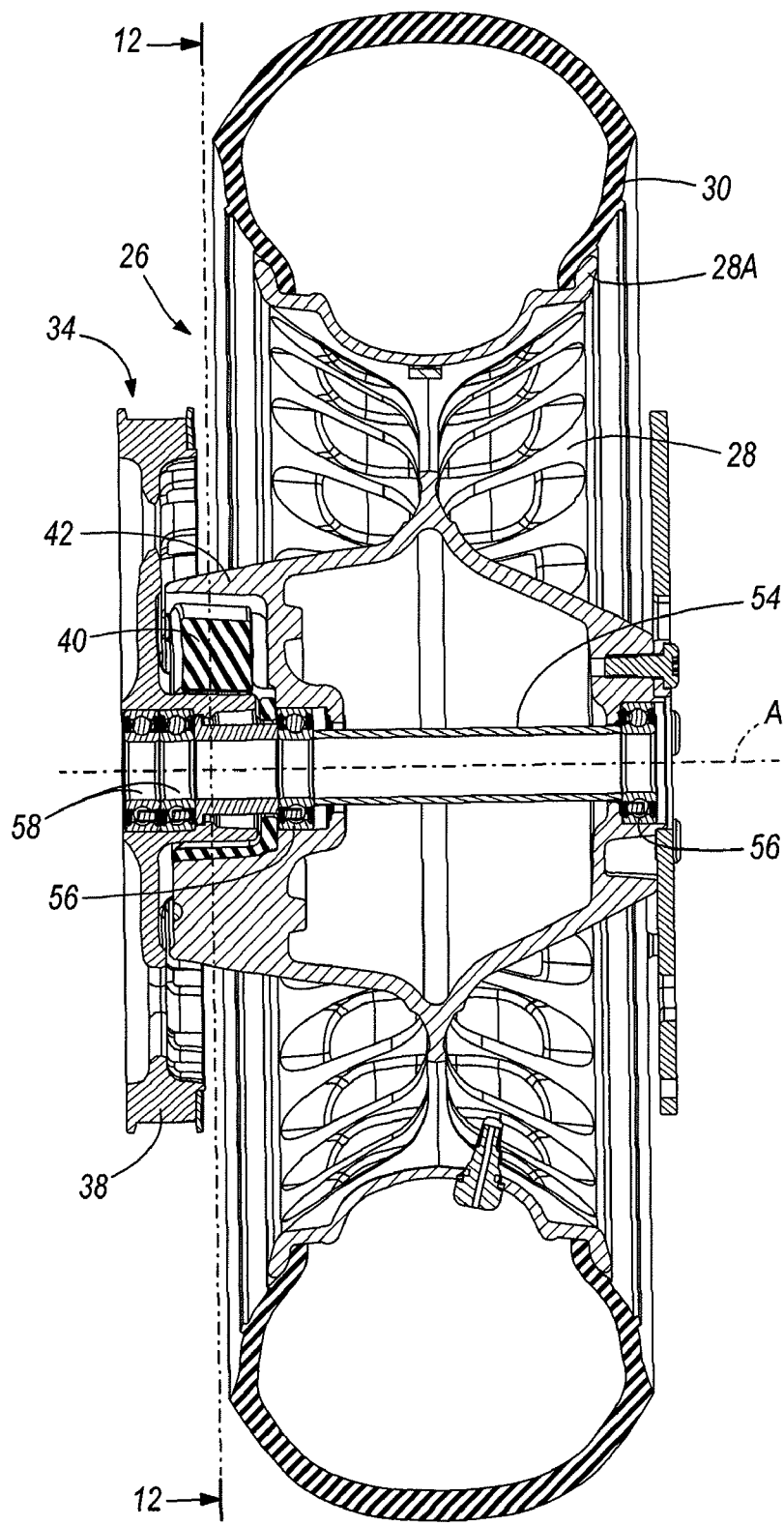
FIG. 3 is a cross-sectional view of the rear wheel assembly taken along line 3-3 of FIG. 2.

A torque dampening compensator assembly 34 (i.e., "compensator") of the rear wheel assembly 26 is configured to attenuate the positive and negative torque peaks between the engine/transmission assembly 24 and the rear wheel assembly 26. With reference to FIGS. 2 and 3, the compensator 34 includes an input member in the form of a belt-driven sprocket 38, an isolator member 40, and an output member in the form of a rear wheel hub 42. The rear wheel hub 42 is part of the wheel 28 and is coupled to the rim 28A and the tire 30 to rotate directly therewith. The sprocket 38 includes a plurality of spaced-apart teeth 38A (FIG. 5) and is rotated directly by the drive member 27 and is coupled to the rear wheel 28, including the rear wheel hub 42, to allow limited relative rotation therebetween. As described in further detail below, the isolator member 40 is disposed between the sprocket 38 and the rear wheel hub 42 to dampen the torque pulsations therebetween.

Figure 5:
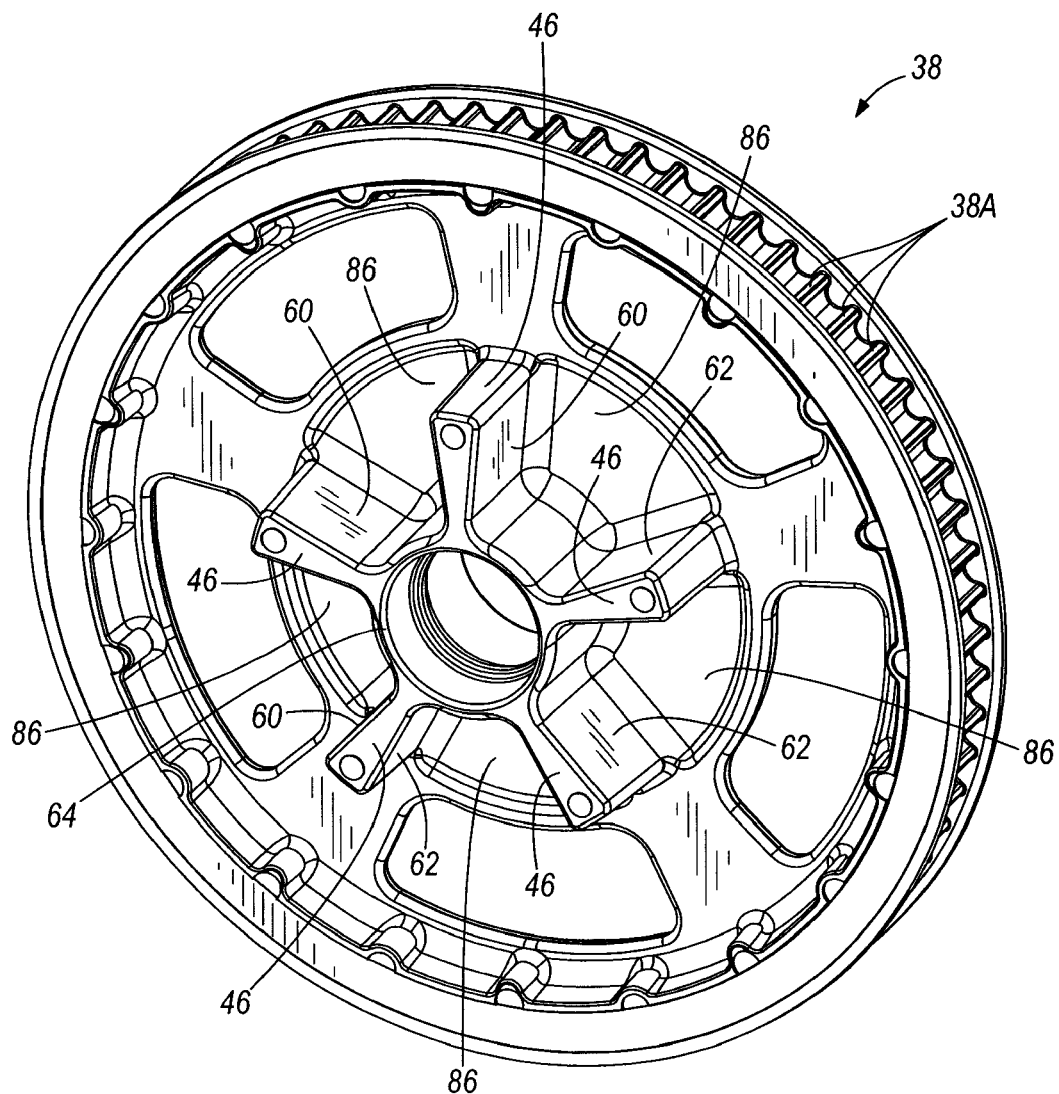
FIG. 5 is a perspective view of a sprocket of the rear wheel compensator of FIG. 3.
Figure 6:
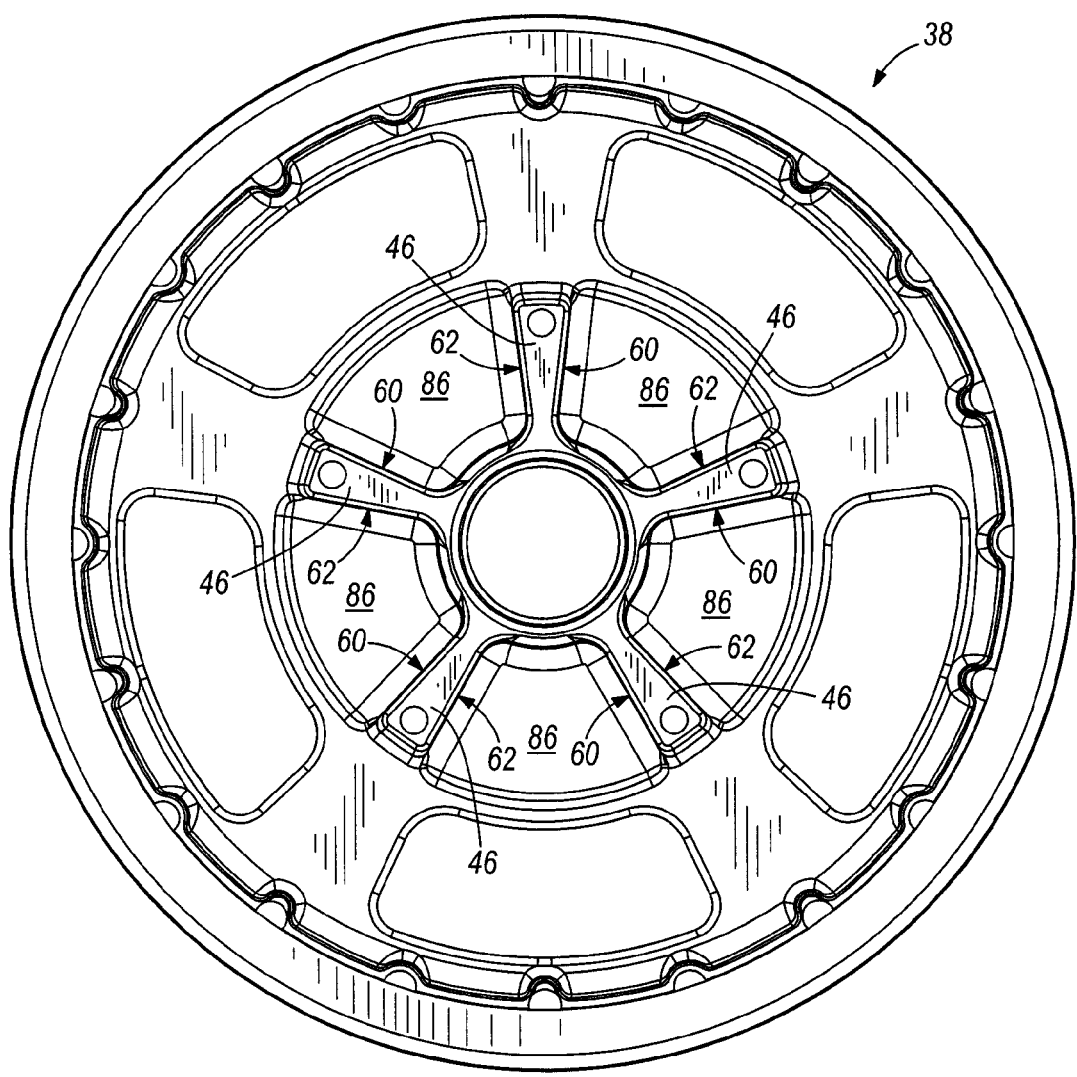
FIG. 6 is a side view of the sprocket of FIG. 5.
Figure 7:
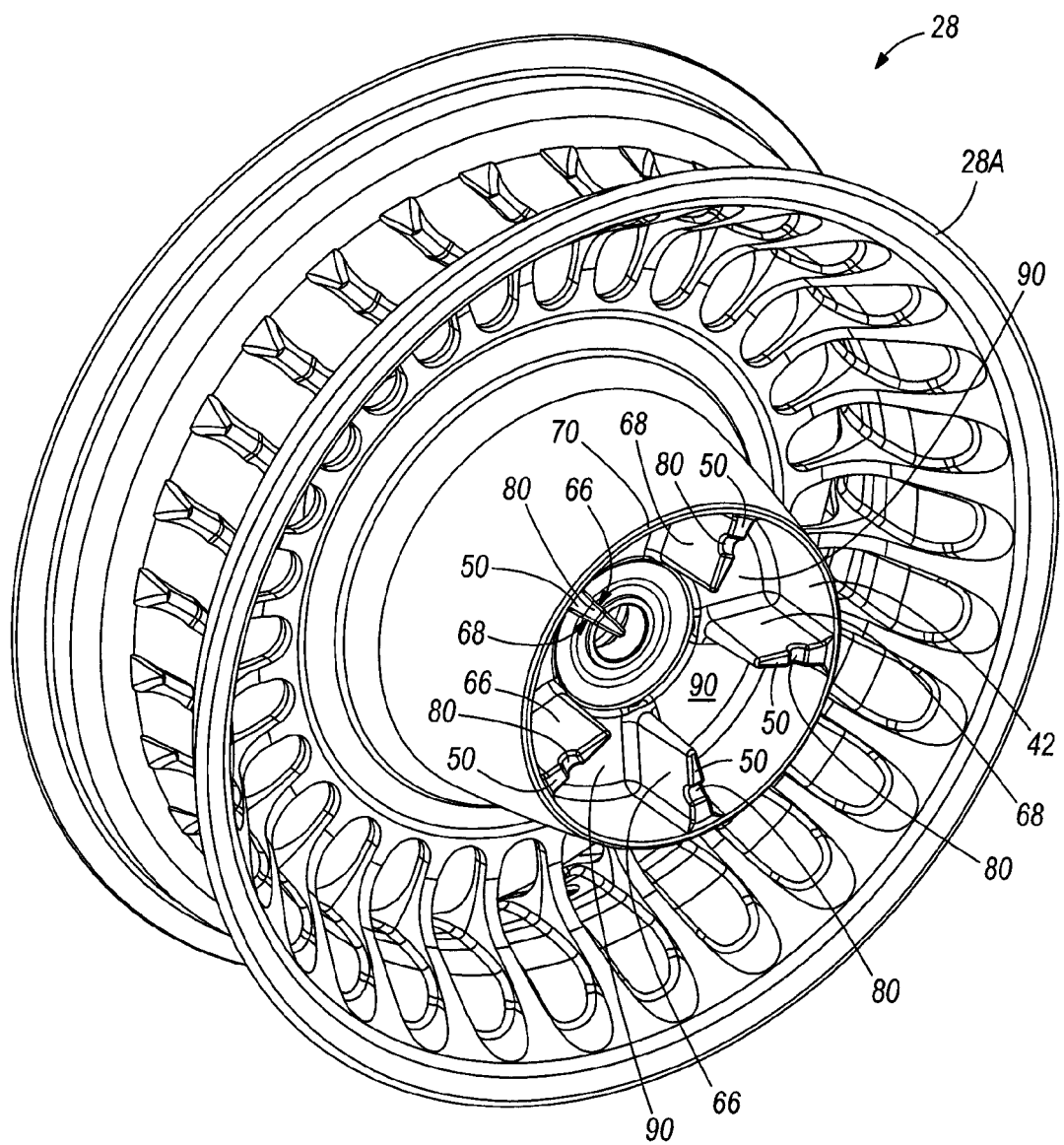
FIG. 7 is a perspective view of a wheel hub of the rear wheel compensator of FIG. 3.
Figure 8:
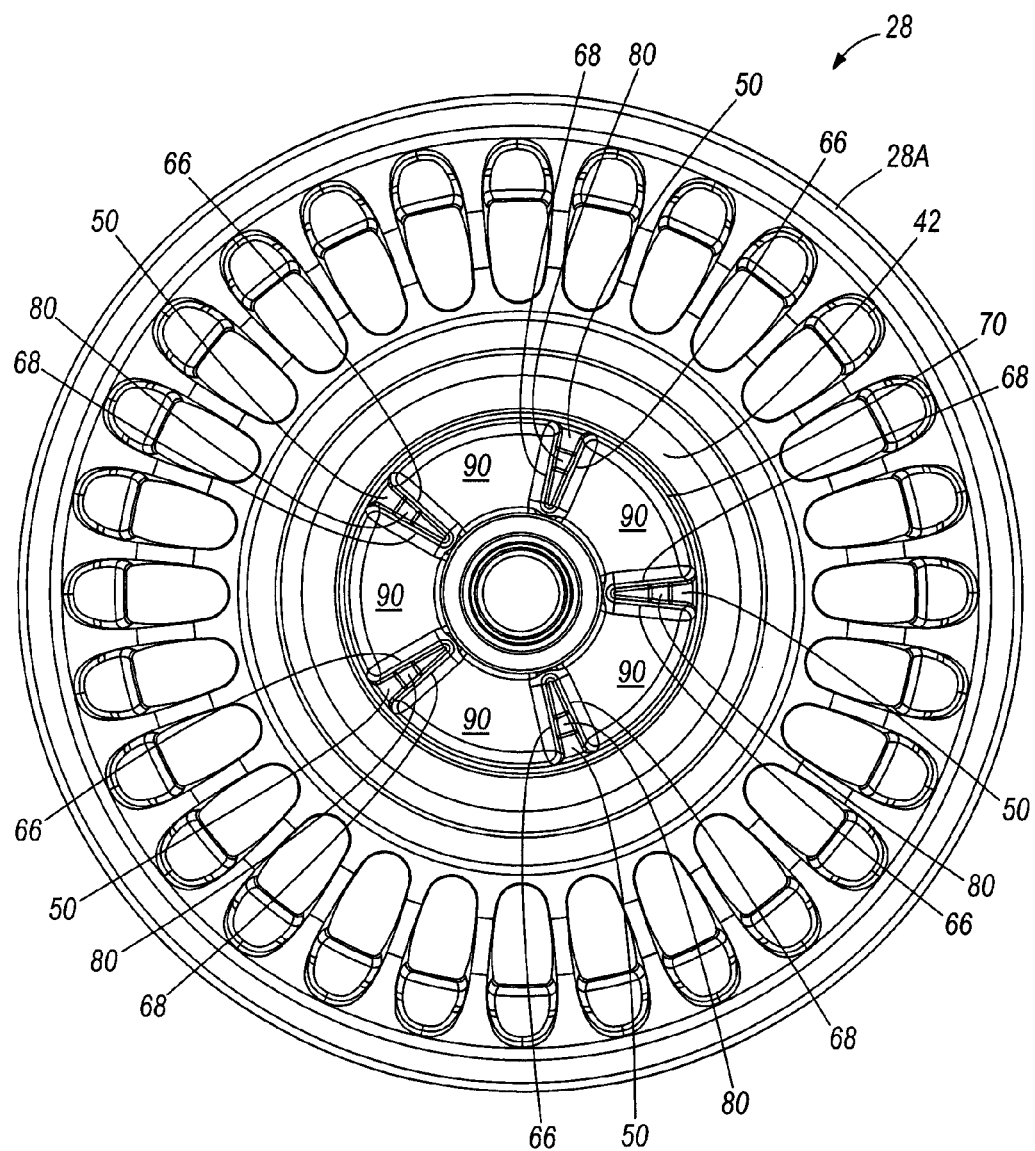
FIG. 8 is a side view of the wheel hub of FIG. 7.

The sprocket 38 receives an input torque from the engine/transmission assembly 24 via the drive member 27. As shown in FIGS. 5 and 6, the sprocket 38 includes a plurality of spaced-apart, radially-extending lugs 46 operable to transmit the input torque. The isolator member 40 is operable to receive the input torque from the lugs 46 of the sprocket 38 and transmit an output torque to the rear wheel hub 42 via a plurality of spaced-apart, radially-extending lugs 50 thereof (FIGS. 7 and 8). The isolator member 40 selectively absorbs a portion of the input torque as described below.

The isolator member 40 is operable to transmit an output torque that is less than or equal to the input torque received from the sprocket lugs 46. Torque is output from the engine 24A according to a torque signature (related to the spaced-apart power strokes of the respective pistons). Thus, even at steady-state throttle and engine speed, the actual torque from the engine 24A varies significantly. Commonly, an engine's output is measured and referred to by taking the average or mean of the peaks and valleys in the torque signature. When mean torque from the engine/transmission assembly 24 changes abruptly a non-steady-state torque condition is introduced (e.g., from an abrupt throttle input), the isolator member absorbs a portion of the input torque, so that only a fraction of the input torque from the sprocket 38 is initially transmitted to the rear wheel hub 42. In addition to being responsive to changes in mean torque output, the compensator assembly 34 is operable to selectively absorb energy in order to smooth out the torque peaks in the engine's torque signature (that occur even during steady-state engine conditions), keeping the peak torque values closer to the mean torque output of the engine 24A. The isolator member 40 also buffers the sprocket 38 from any abrupt change in rotation originating at the rear wheel 28 and tire 30.

Figure 4:
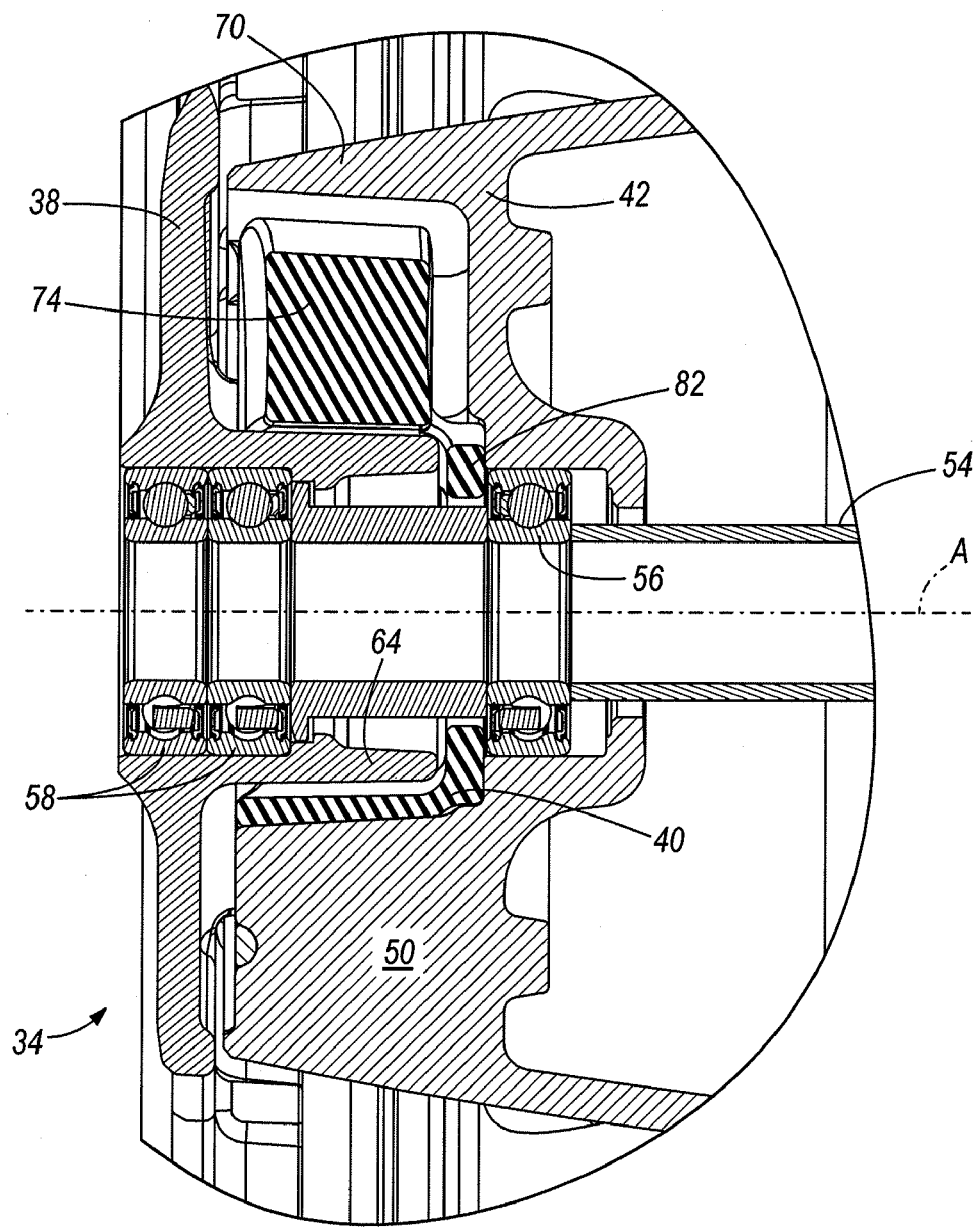
FIG. 4 is a detail cross-sectional view of the rear wheel compensator as shown in FIG. 3.

As shown in FIGS. 3 and 4, the rear wheel assembly 26 is rotatably coupled to a rear axle 54 with a pair of bearings 56. The rear axle defines an axis of rotation A of the rear wheel assembly 26. The sprocket 38 is supported at its center by additional bearings 58 (e.g., two single-row standard deep-groove ball bearings) for rotational movement relative to the axle 54 and, to a lesser degree, relative to the rear wheel hub 42. As described in further detail below, the bearings 58 supporting the sprocket 38 need not include an angular contact ball bearing to withstand thrust loads, as the compensator 34 is designed to reduce or eliminate thrust loads between the sprocket 38 and the rear wheel hub 42.

Figure 12:
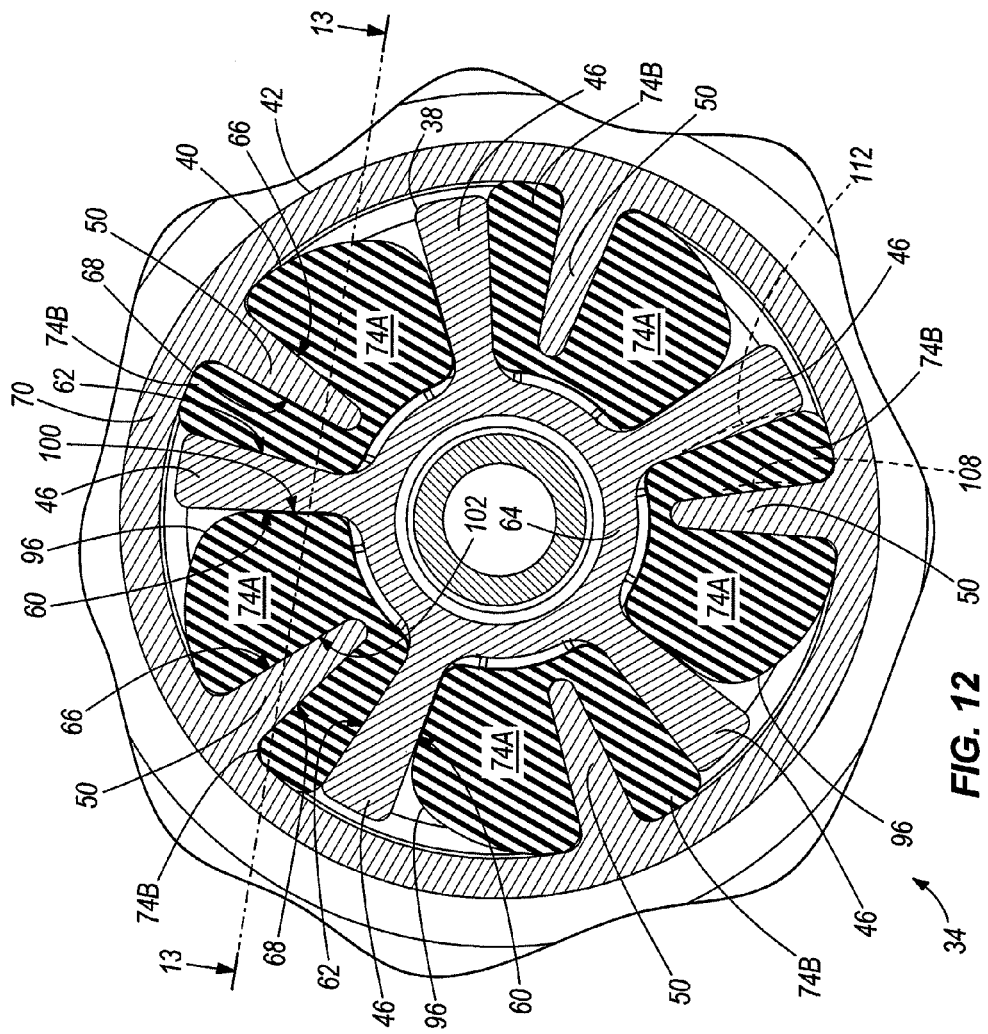
FIG. 12 is a cross-sectional view of the rear wheel compensator taken along line 12-12 of FIG. 3.

As shown in at least FIGS. 5 and 6, each of the lugs 46 includes a first contact face 60 and a second contact face 62. The contact faces 60, 62 extend generally radially from a hub portion 64 of the sprocket 38, perpendicular to the axis A. The five lugs 46 are arranged in a star-shaped pattern about the axis A. The rear wheel hub 42 is at least partially nested with the sprocket 38 such that the lugs 50 of the hub 42 overlap axially with the sprocket lugs 46. As shown in at least FIGS. 7 and 8, each of the hub lugs 50 includes a pair of contact faces 66, 68, each of which extends generally radially toward and perpendicular to the axis A from a rim portion 70 of the hub 42. The lugs 46 of the sprocket 38 are intermeshed, although not contacting, with the lugs 50 of the hub 42 so that the respective lugs 46, 50 alternate circumferentially. The respective sets of lugs 46, 50 are circumferentially spaced from one another to create a plurality of spaces therebetween. In the illustrated embodiment, ten such spaces are present, each being occupied by a portion of the isolator member 40 (FIG. 12).

The isolator member 40 is shown in FIGS. 9-11B and includes five pairs of isolator portions or elements 74. The isolator member 40 includes five large isolator elements 74A and five small isolator elements 74B, each large isolator element 74A being paired with a small isolator element 74B such that the large and small isolator elements 74A, 74B alternate circumferentially. The large isolator elements 74A are positioned between the respective first contact faces 60, 66 of the sprocket and hub lugs 46, 50 to absorb/transmit positive loads (e.g., upon acceleration). The small isolator elements 74B are positioned between the respective second contact faces 62, 68 of the sprocket and hub lugs 46, 50 to absorb/transmit negative loads (e.g., upon deceleration). The large isolator elements 74A have a higher energy absorption capacity necessary for the large amounts of power and torque that can potentially be transmitted abruptly from the engine/transmission assembly 24.

Each pair of large and small isolator elements 74A, 74B are coupled by a strap 78 that is positioned across the isolator elements 74A, 74B (at a radially central location thereof). The straps 78 are positioned at the outboard or sprocket-facing side of the isolator member 40 and engage corresponding notches 80 in the hub lugs 50 (FIGS. 7 and 8). The isolator member 40 further includes a central ring 82 to which each pair of isolator elements 74A, 74B is coupled. The central ring 82 is positioned at the inboard or hub-facing side of the isolator member 40. Each paired set of isolator elements 74A, 74B straddles one of the hub lugs 50, and the isolator member 40 as a whole is axially and radially positioned by the straps 78 contacting the respective hub lugs 50.

Recesses 86 are formed in the sprocket 38 between adjacent lugs 46 as shown in FIGS. 5 and 6. The recesses 86 provide space in the axial direction to prevent rubbing between the sprocket 38 and outboard surfaces 88 of the isolator elements 74A, 74B that otherwise occurs in conventional compensators that are tightly packaged in the axial direction. The outboard surfaces 88 (FIGS. 9, 11B, and 13) are also truncated and/or concave to limit the amount of axial expansion that occurs under compression between sprocket and hub lugs 46, 50. Thus, the likelihood of stretching and cracking of the material is reduced and durability is increased. Recesses 90 are also formed in the hub 42 between adjacent lugs 50 as shown in FIGS. 7 and 8. The recesses 90 provide space in the axial direction to prevent rubbing between the hub 42 and inboard surfaces 92 of the isolator elements 74A, 74B. The inboard surfaces 92 (FIGS. 10, 11A, and 13) are also truncated and/or concave to limit the amount of axial expansion that occurs under compression between sprocket and hub lugs 46, 50. Ample axial clearance is provided on both sides of the isolator member 40 to prevent abrasion of the isolator elements 74A, 74B and thrust loading of the bearings (discussed in further detail below) during relative rotation between the sprocket 38 and the hub 42.

As shown in FIG. 12, each of the large isolator elements 74A includes a truncated portion 96 at a radially outward part thereof, creating a gap where the large isolator elements 74A do not contact the sprocket 38 or the hub 42. The gap exists as shown in FIG. 12 when the compensator is in its neutral state and the isolator elements 74A, 74B are not compressed between respective sprocket and hub lugs 46, 50. During compression of the large isolator elements 74A, the gap size is decreased as increasing contact is established between the truncated portion 96 and both the sprocket lugs 46 and the rim portion 70 of the hub 42. This gives the compensator a progressive damping rate that allows substantial absorption at high torque low engine speed (i.e., preventing audible rattling of transmission gears that may otherwise occur) while being stiff enough to offer acceptable drivability with little or no lag in power delivery. The available stiffness also eliminates resonances from occuring within the normal operating range of the engine. The torsional hysteresis curve of the isolator member 40 as it dissipates torsional vibration and shock loading is non-linear.

Figure 13:
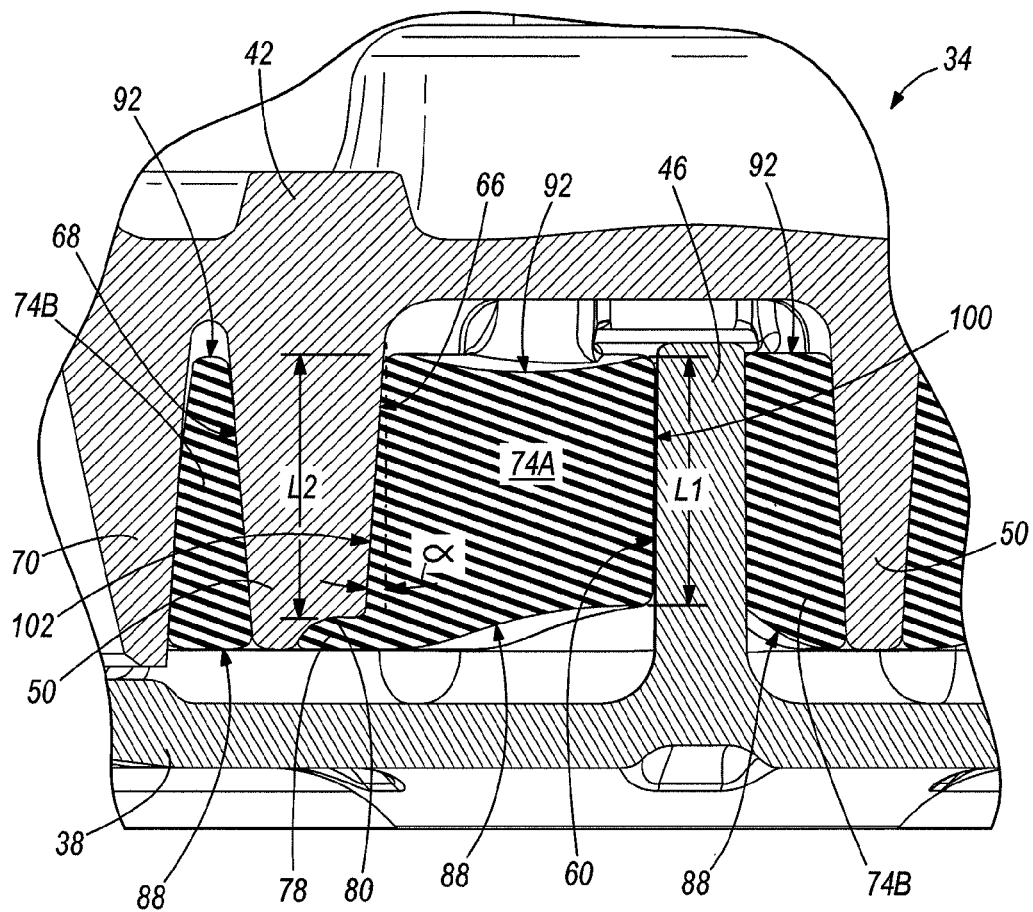
FIG. 13 is a detail cross-sectional view of a portion of the rear wheel compensator taken along line 13-13 of FIG. 12.

As shown in FIG. 13, each of the wheel lugs 50 is formed with a slight draft angle α such that the contact faces 66, 68 are not parallel with the compensator axis A. The contact faces 66, 68 lie at an angle α of about 3 degrees offset from being parallel with the axis A in the illustrated construction. The draft angle α is present for manufacturability to cast the hub 42. When either the large or small isolator elements 74A, 74B are compressed between sprocket and hub lugs 46, 50, the draft angle α on the hub lugs 50 tends to initiate or promote a thrust load between the sprocket 38 and the hub 42 through the compressed isolator elements 74A or 74B. Although the recesses 86, 90 in the sprocket 38 and hub 42 prevent substantial thrust loading of the bearings 58 caused by axial expansion of the isolator elements 74A, 74B, the draft angle α of the hub lugs 50 encourages the isolator elements 74A, 74B to slide axially relative to the sprocket 38 and the hub 42. To counteract the thrust load from propogating through the isolator elements 74A, 74B and acting to push the sprocket 38 and the hub 42 apart, a moment is induced on each of the isolator elements 74A, 74B by a feature designed into the isolator elements 74A, 74B. The effect is illustrated and described below with particular reference to one of the large isolator elements 74A for exemplary purposes.

As shown in FIG. 13, the large isolator element 74A includes opposing surfaces 100, 102 in contact with the respective first contact faces 60, 66 of the sprocket and hub lugs 46, 50. The surface 100 of the large isolator element 74A that contacts the first contact face 60 of the sprocket lug 46 defines a first axial contact length L1. The surface 102 of the large isolator element 74A that contacts the first contact face 66 of the hub lug 50 defines a second axial contact length L2 that is larger than the first axial contact length L1. The effective contact between the hub lug 50 and the isolator element 74A extends further outboard than the contact between the isolator element 74A and the sprocket lug 46. Therefore, the surfaces 100, 102 are asymmetrical and a moment is imparted to the large isolator element 74A when it is compressed between the sprocket and hub lugs 46, 50. The moment counteracts the thrust-load-inducing effect of the hub lug draft angle α by effectively "pulling" the sprocket 38 in towards the hub 42 through static friction between the isolator member 40 and the sprocket lugs 46.

Figure 14:
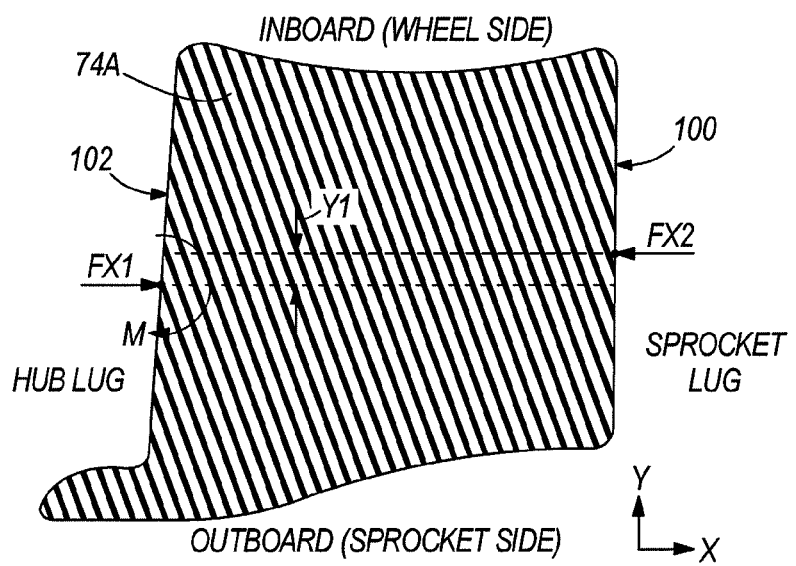
FIG. 14 is a free body diagram of one isolator element of the isolator member of FIGS. 9-11B.

FIG. 14 is a simplified free body diagram of one large isolator element 74A to illustrate how the asymmetry designed into the isolator member 40 counteracts thrust load from being propagated between the sprocket 38 and the hub 42. Counteracting forces FX1 and FX2 are incident on the isolator element 74A from the hub lug 50 and the sprocket lug 46, respectively. The x-direction forces FX1, FX2 are resolved from distributed surface forces to centralized point loads in FIG. 14. Because the x-direction forces FX1, FX2 are offset in the y-direction by an axial offset distance Y1, a moment is necessarily generated. A reactant moment M (clockwise in FIG. 14) about the point of application of the force FX2 balances the initial moment (counterclockwise in FIG. 14) to maintain static equilibrium. The static friction force (not shown in FIG. 14) on the isolator element 74A from the sprocket lug 46 on the corresponding surface 100 of the isolator element 74A is responsible for the reactant moment M. The equal and opposite static friction force applied by the isolator element 74A on the sprocket 38 creates the effect of "pulling" of the sprocket 38 axially inboard towards the hub 42 in order to counteract the natural tendency for the sprocket 38 and the hub 42 to experience a separation type thrust load due to the draft angle α.

It will be appreciated that the above-described phenomenon occurs at each of the isolator elements 74A, 74B, and the overall effect is counteraction of the thrust load on the bearings 58 as the sprocket 38 and the hub 42 are inhibited from being urged axially apart from each other by the isolator member 40. Because substantial thrust loading between the sprocket 38 and the hub 42 is avoided, the bearings 58 that support the sprocket 38 on the hub 42 need not be configured to accommodate thrust loads. For example, a compensator that is not particularly configured to avoid thrust loading is typically provided with an angular contact ball bearing to properly bear the thrust load. In the compensator 34, the bearings 58 are provided as two single-row standard deep-groove ball bearings that are widely available and relatively inexpensive compared to angular contact ball bearings or other means that may be provided to accommodating thrust loading. The illustrated compensator 34 eliminates the need for any such means.

As shown in FIGS. 9-12, one of the small isolator elements 74B is formed differently from the rest and includes a lug-facing concave side 108. Opposite the concave side 108, a second side of the small isolator element 74B includes a projection or protuberance 112 having a generally convex shape. FIGS. 9-11B illustrate the isolator member 40 in a natural, unstressed state. As shown in FIG. 12, the concave side 108 faces a hub lug 50 and the protuberance 112 faces an adjacent sprocket lug 46 when the isolator member is positioned in the compensator 34. FIG. 12 illustrates the compensator 34 in a neutral state in which the isolator member 40 is not being compressed to actively absorb rotational energy during transmission between the sprocket 38 and the hub 42. In the neutral state of the compensator 34, the one differently-formed small isolator element 74B is deformed from its natural shape to fit into the space between the corresponding sprocket and hub lugs 46, 50. Particularly, the concave side 108 is put into tension to assume a relatively flat shape to lie against the second contact face 68 of the corresponding hub lug 50, and the protuberance 112 is compressed to assume a relatively flat shape to lie against the second contact face 62 of the corresponding sprocket lug 46. FIG. 12 shows the natural shape of the concave side 108 and the protuberance 112 in dashed lines.

As shown in FIG. 12, the differently-shaped small isolator element 74B is not oversized for the space between the corresponding sprocket and hub lugs 46, 50. Rather, the shape of the isolator element 74B is different from the shape of the corresponding space. Accordingly, the differently-shaped isolator element 74B must be deformed to assemble the compensator 34, but the deformation is not in the form of overall compression of the isolator element 74B into a smaller space (i.e., the allotted volume of space between the corresponding sprocket and hub lugs 46, 50 is not substantially smaller than the volume of the isolator element 74B in its natural state). Thus, the bending of the isolator element 74B (from the dashed line shape to the solid line shape in FIG. 12) during assembly of the compensator 34 imparts a spring-biasing force or preload into the compensator 34. The presence of this deformation and spring-bias reduces the effect of compression set in the compensator 34, which commonly results in substantial lash or "play" in the driveline after repeated use in existing compensators.

Figure 9:
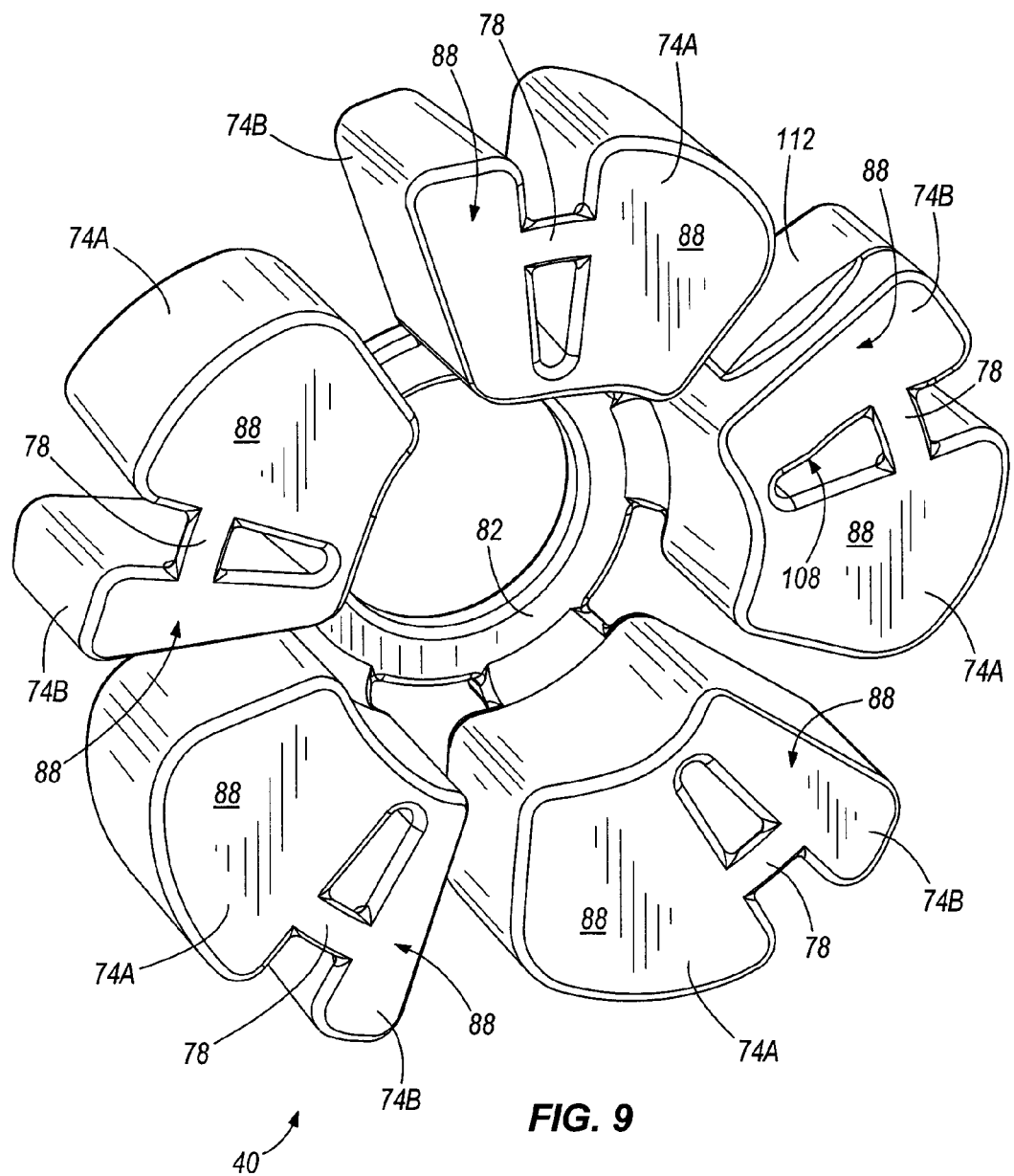
FIG. 9 is a perspective view of an isolator member of the rear wheel compensator of FIG. 3.
Figure 10:
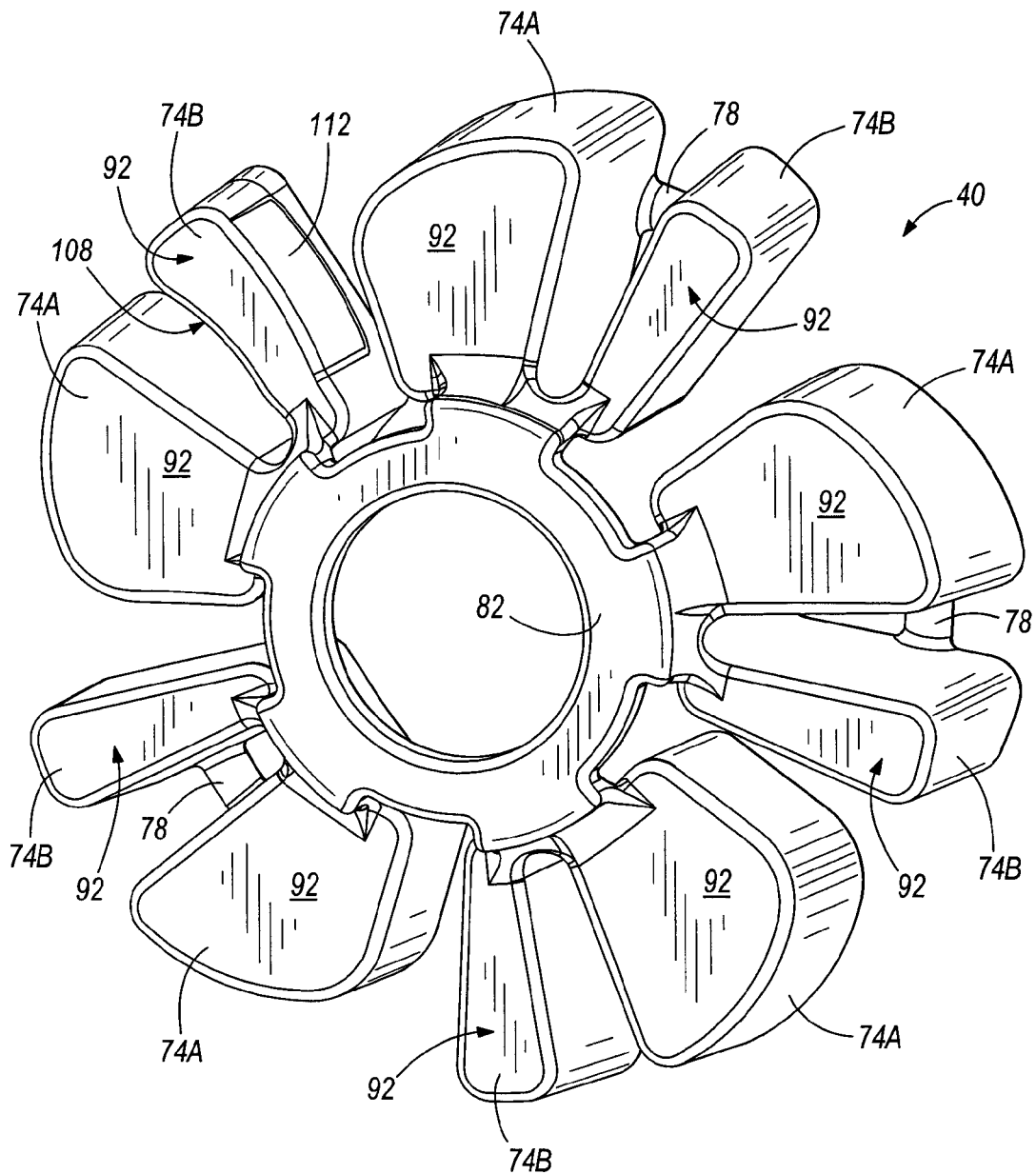
FIG. 10 is an alternate perspective view of the isolator member of FIG. 9.
Figure 11A:
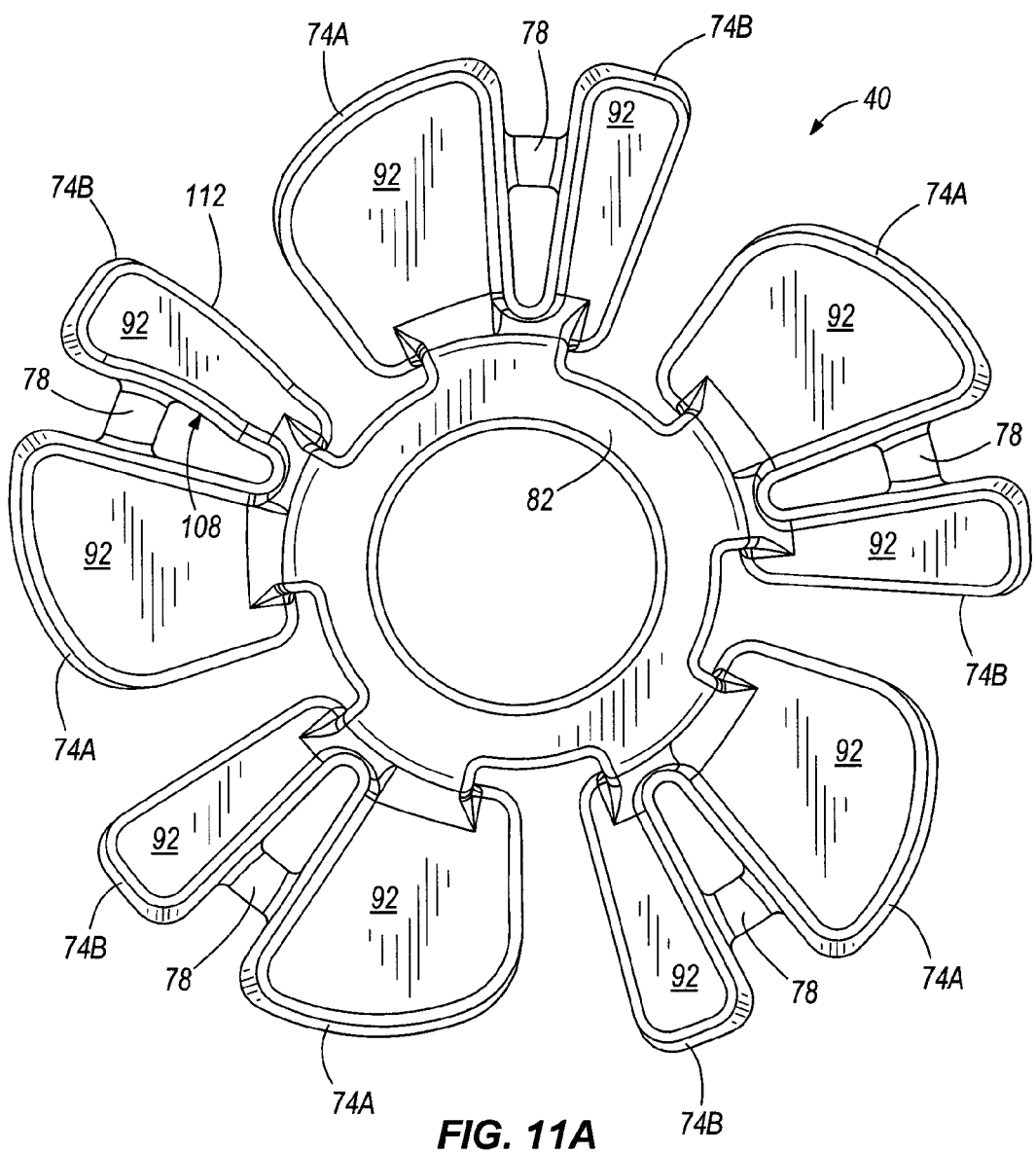
FIG. 11A is a side view of the isolator member of FIG. 9.
Figure 11B:
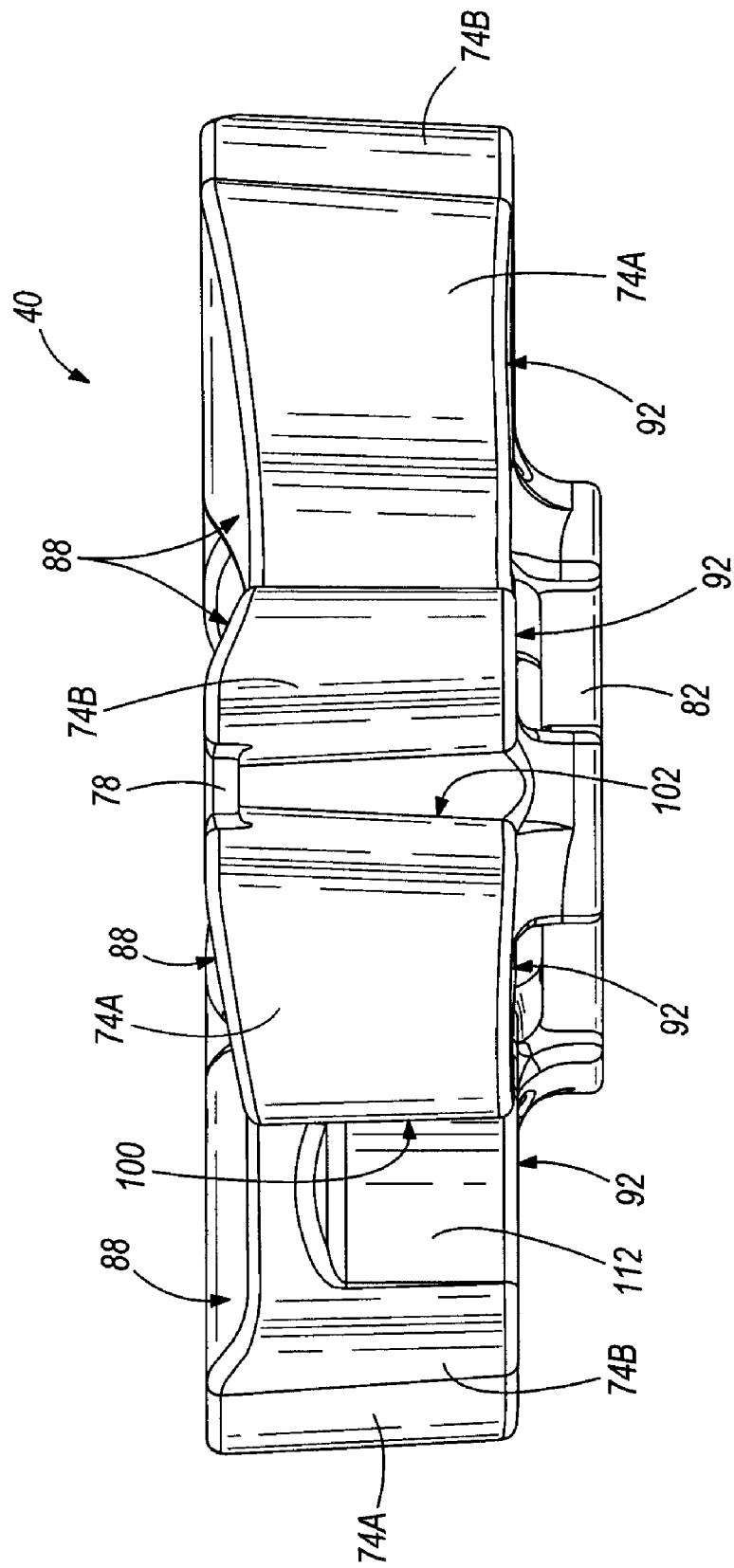
FIG. 11B is a top view of the isolator member of FIG. 9.

Rather than making one or more of the isolator elements 74A, 74B oversized and requiring that they be compressed into place during assembly to achieve a preload in the compensator, the compensator 34 is assembled by deflecting or deforming only the one differently-shaped small isolator element 74B. Thus, assembly of the compensator 34 is not complicated and requires low effort. Further easing assembly effort, the protuberance 112 does not extend the full axial depth of the small isolator element 74B. As illustrated in FIGS. 9 and 10, the protuberance 112 extends only about three fourths of the overall axial depth of the small isolator element 74B from the inboard side.

Thus, the invention provides, among other things, a compensator 34 that is easy to assemble, resistant to compression set, and inexpensive to manufacture due to the exclusion of a thrust bearing. The compensator 34 has progressive response and features that enhance durability and avoid excessive stretching of the isolator member 40 during compression. Various features and advantages of the invention are set forth in the following claims.

What is claimed is:

1. A torque dampening compensator for a vehicle comprising:
   an input member operable to receive an input torque, the input member including a first lug portion operable to transmit the input torque;
   an output member operable to transmit an output torque that is less than or equal to the input torque, the output member including a second lug portion operable to receive the output torque; and
   an isolator member disposed between the input member and the output member, the isolator member operable to receive the input torque from the input member, to selectively absorb a portion of the input torque, and to transmit the output torque to the output member,
   wherein the isolator member includes a first portion positioned in a space between the first lug portion and the second lug portion, the first portion of the isolator member having a size corresponding to the space and having a shape that is dissimilar to the space, the first portion of the isolator member being resiliently deformable into the space, wherein the isolator member includes a plurality of spaced-apart portions positioned in a plurality of separate spaces between corresponding pairs of lug portions of the input and output members, the space between the first lug portion of the input member and the second lug portion of the output member having a predetermined size when the compensator is in a neutral state with each of the plurality of spaced-apart portions of the isolator member being positioned in a respective one of the plurality of separate spaces between corresponding pairs of lug portions of the input and output members, wherein the first portion of the isolator member includes a first side that is generally concave and a second side opposite the first side having a protrusion.

2. The torque dampening compensator of claim 1, wherein the first portion of the isolator member is resiliently deformed between the first and second lug portions when the compensator is in the neutral state such that the first generally concave side of the isolator member is stressed in tension and the protrusion is compressed.

3. The torque dampening compensator of claim 2, wherein the first portion of the isolator member is the only portion of isolator member configured to be substantially deformed in the neutral state of the compensator.

4. The torque dampening compensator of claim 3, wherein the first and second lug portions have an axial overlap and the first portion of the isolator member has an axial depth within the axial overlap, the protrusion extending along the second side of the first portion of the isolator member in the axial direction a length substantially less than the axial depth of the first portion of the isolator member.

5. The torque dampening compensator of claim 4, wherein the protrusion extends along the second side of the first portion of the isolator member in the axial direction a length about three fourths the axial depth of the first portion of the isolator member.

6. The torque dampening compensator of claim 1, wherein the plurality of spaced-apart portions of the isolator member include a plurality of first portions for absorbing torque impulses in a first rotational direction between the input and output members and a plurality of second portions for absorbing torque impulses in a second rotational direction between the input and output members that is opposite the first rotational direction.

7. The torque dampening compensator of claim 6, wherein each of the plurality of first portions is paired with one of the plurality of second portions, each pair of first and second portions being coupled together with a connecting strap.

8. The torque dampening compensator of claim 6, wherein the plurality of first portions and the plurality of second portions are all coupled to a central ring.

9. A torque dampening compensator for a vehicle comprising:
   an input member rotatable about an axis and operable to receive an input torque, the input member including a first radially-extending lug operable to transmit the input torque, the first radially-extending lug having a first radially-extending contact face;
   an output member rotatable about the axis and operable to transmit an output torque that is less than or equal to the input torque, the output member including a second radially-extending lug operable to receive the output torque, the second radially-extending lug having a second radially-extending contact face; and an isolator member disposed between the input member and the output member, the isolator member operable to receive the input torque from the input member, to selectively absorb a portion of the input torque, and to transmit the output torque to the output member, wherein the isolator member includes a first portion having a first surface in contact with the first contact face and a second surface in contact with the second contact face, at least one of the first and second contact faces being non-parallel with the axis and having a draft angle promoting a thrust load between the input member and the output member when the isolator member is compressed between the first and second lugs, and wherein the first and second surfaces of the isolator member are asymmetrical, counteracting the thrust load, and wherein the first and second lugs have an axial overlap and the first portion of the isolator member has an axial depth within the axial overlap, the contact between one of the first and second lugs and the first portion of the isolator member being greater in the axial direction than the contact between the other of the first and second lugs and the first portion of the isolator member.

10. The torque dampening compensator of claim 9, wherein the second lug is non-parallel with the axis and has a draft angle, the contact between the second lug and the first portion of the isolator member is greater in the axial direction than the contact between the first lug and the first portion of the isolator member.

11. The torque dampening compensator of claim 9, wherein the first portion of the isolator member further includes an inboard surface facing a body portion of one of the input member and the output member and an outboard surface facing a body portion of the other of the input member and the output member, both the inboard surface and the outboard surface being generally concave.

12. The torque dampening compensator of claim 11, wherein the inboard and outboard surfaces are spaced from the respective body portions of the input member and the output member.

13. The torque dampening compensator of claim 12, wherein the first portion of the isolator member is resiliently compressed between the first and second lugs, increasing the axial depth of the first portion of the isolator member, the first portion of the isolator member being configured to maintain its inboard and outboard surfaces out of contact with the respective body portions of the input and output members during compression of the first portion of the isolator member.

14. The torque dampening compensator of claim 9, wherein the input member includes a third radially-extending lug, the second lug of the output member being circumferentially interposed between the first and third lugs of the input member.

15. The torque dampening compensator of claim 14, wherein the isolator member includes a second portion positioned between the second lug and the third lug, the first portion being configured to absorb torque impulses in a first rotational direction between the input and output members and the second portion being configured to absorb torque impulses in a second rotational direction between the input and output members that is opposite the first rotational direction, the first and second portions of the isolator member being coupled together with a strap extending directly across the second lug.

16. The torque dampening compensator of claim 15, wherein the first portion and the second portion are respective ones of a plurality of spaced-apart first portions and a plurality of spaced-apart second portions, wherein the plurality of first portions and the plurality of second portions are all coupled to a central ring.

* * * * *